UNITED STATES PATENT OFFICE.

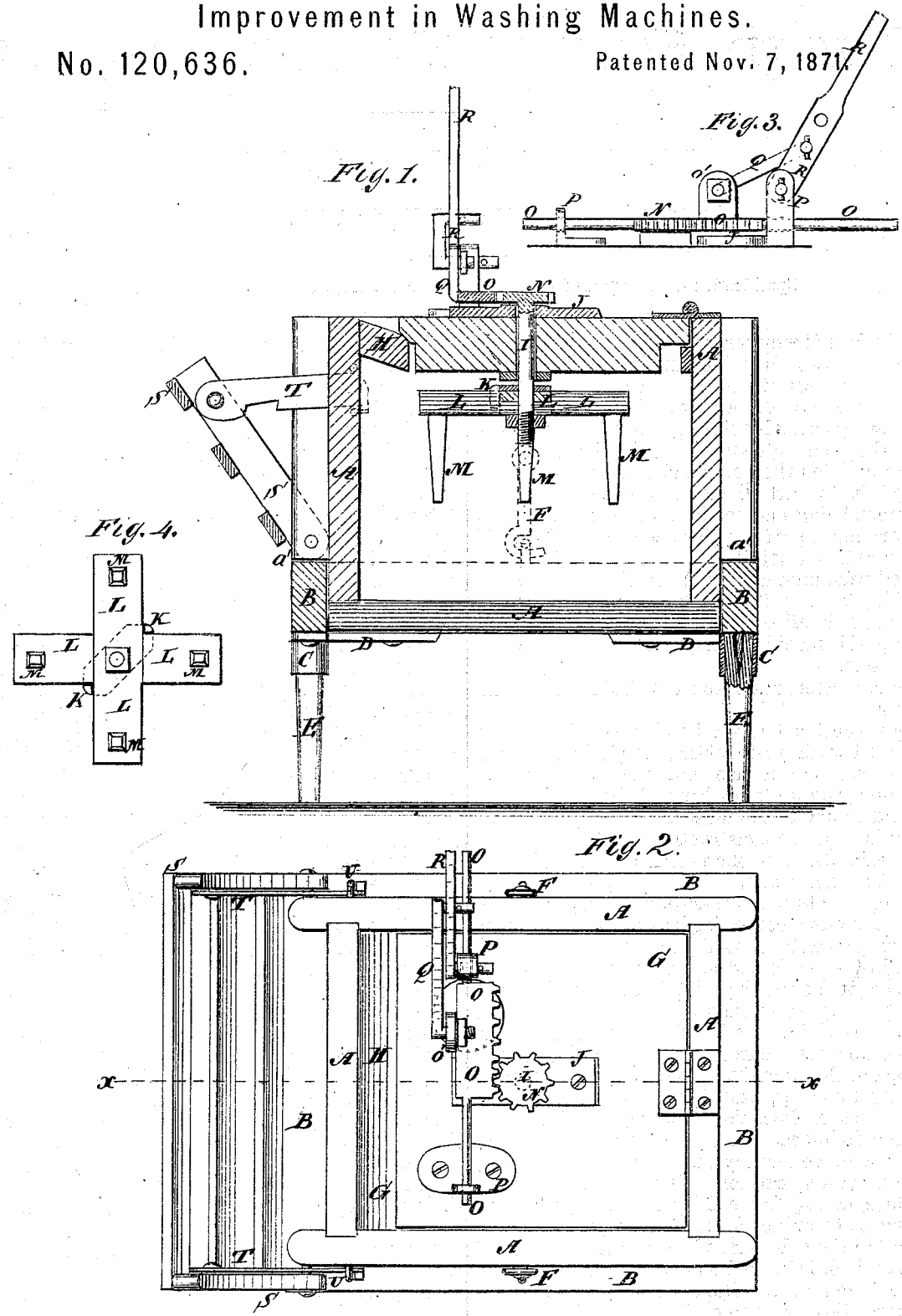

JOHN FOX, OF FARMERSVILLE, IOWA.

IMPROVEMENT IN WASHING-MACHINES.

Specification forming part of Letters Patent No. 120,636, dated November 7, 1871.

*To all whom it may concern:*

Be it known that I, JOHN FOX, of Farmersville, in the county of Mahaska and State of Iowa, have invented a new and useful Improvement in Washing-Machines; and I do hereby declare that the following is a full, clear, and exact description thereof, which will enable others skilled in the art to make and use the same, reference being had to the accompanying drawing forming a part of this specification.

Figure 1 is a detail vertical section of my improved washing-machine taken through the line $x\ x$, Fig. 2. Fig. 2 is a top view of the same. Fig. 3 is a detail side view of the device for operating the machine. Fig. 4 is a detail view of the beater.

Similar letters of reference indicate corresponding parts.

My invention has for its object to furnish an improved washing-machine, simple in construction, convenient in use, and effective in operation, doing its work quickly and thoroughly, and without injury to the most delicate fabrics; and it consists in the construction and combination of certain parts of the machine, as hereinafter more fully described.

A represents the water-box of the machine, which is made rectangular in form, and the lower part of which fits into the frame B, and is supported by shoulders $a'$ formed upon the projecting ends of the side boards of said box, as shown in Fig. 1. C are sockets which are formed upon the angles of the bars D, which are bent at right angles, and are secured to the lower sides of the corners of the frame B. The sockets C are made slightly tapering, and the legs E are passed through them from the upper side, and may be wedged in place. This construction allows the machine to be readily taken apart for convenience in transportation. The box A is secured in place in the frame B by hooks F pivoted to the sides of the box A and hooking into eyes attached to the side bars of the frame B. G is the cover, which is hinged at one edge to the upper edge of the box A. The cover G is made a little narrower than the top of the box A, the remaining space being covered by a narrow inclined apron, H, attached to the said box A, and which is especially intended to conduct the water from the wringer back into the box A. I is a square shaft that passes down vertically through the cover G, and is supported by and revolves in a bearing, J, attached to the upper side of said cover. The lower part of the shaft I passes down through a plate, K, and through the centers of the bars L, which cross each other at right angles, and are secured in place upon the shaft I by a nut screwed upon its lower end. The ends of the plate K are made pointed, and are bent downward to enter the opposite angles of the crossed bars L, to serve as a clutch to carry the said bars L, with the said shaft I, in its revolution. To the outer ends of the bars L are attached the upper ends of the downwardly-projecting arms M, which, as the shaft I is revolved, take hold of the clothes to be washed and sweep them through the water in the box A. To the upper end of the shaft I is attached a small gear-wheel, N, into the teeth of which mesh the teeth of a rack-bar, O, the end parts of which slide in guides P attached to the cover G. To a lug, $o'$, formed upon the middle part of the rack-bar O, is pivoted the end of a connecting-rod, Q, the other end of which is pivoted to the lever R, several holes being formed in the said lever to receive the said pivot, so that the distance of the end of the rod Q from the pivoting-point of the lever R may be regulated at will to adjust the throw of the sliding rack O, and thus regulate the movement of the beater L M. The lower end of the lever R is pivoted to the upper part of one of the guides P, and its upper end projects into such a position that it may be conveniently reached and operated to work the machine. If desired, the lower end of the lever R may be pivoted to the lug of the rack-bar O, and the end of the connecting-rod Q to the guide P. By this construction, by operating the lever R a reciprocating rotary motion is given to the beater L M, sweeping the clothes to be washed back and forth through the suds in the box A and washing them quickly and thoroughly. S is a rack, the lower ends of the side bars of which are pivoted to the lower part of the projecting ends of the side boards of the box A. To the upper parts of the side bars of the rack S are pivoted the outer ends of the bars T, which pass through keepers U attached to the sides of the box A, and have notches or stops formed in or attached to them to take hold of the keepers U and hold the rack in place, both when closed up against the box A and when opened out, as shown in Figs. 1 and 2, to receive the clothes.

The rack S T is designed to receive the clothes as they pass from the wringer.

Having thus described my invention, I claim as new and desire to secure by Letters Patent—

1. The armed sockets C D, in combination with the legs E and frame B that supports the water-box A, substantially as herein shown and described, and for the purpose set forth.

2. The combination of the pivoted rack S and arms T with the water-box A of a washing-machine, substantially as herein shown and described, and for the purpose set forth.

JOHN FOX.

Witnesses:
   THO. SHERWOOD,
   ELMER PARKHURST. (91)